US012563370B2

(12) United States Patent
Chitta et al.

(10) Patent No.: US 12,563,370 B2
(45) Date of Patent: Feb. 24, 2026

(54) DIFFERENTIAL CHARGING FOR A USER EQUIPMENT WITH DUAL CONNECTIVITY WITH NEW RADIO (NR) (DCNR) CAPABILITIES

(71) Applicant: Cisco Technology, Inc., San Jose, CA (US)

(72) Inventors: Nithin Chitta, Bangalore (IN); Rajamathangi Subramanian, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 442 days.

(21) Appl. No.: 18/168,183

(22) Filed: Feb. 13, 2023

(65) Prior Publication Data

US 2024/0276184 A1 Aug. 15, 2024

(51) Int. Cl.
| | |
|---|---|
| H04W 4/24 | (2024.01) |
| H04L 12/14 | (2006.01) |
| H04W 8/18 | (2009.01) |
| H04W 76/15 | (2018.01) |
| H04W 88/06 | (2009.01) |

(52) U.S. Cl.
CPC ........... H04W 4/24 (2013.01); H04L 12/1407 (2013.01); H04W 8/18 (2013.01); H04W 76/15 (2018.02); H04W 88/06 (2013.01)

(58) Field of Classification Search
CPC ......... H04W 4/24; H04W 8/18; H04W 76/15; H04W 88/06; H04W 76/12; H04W 88/14;

H04L 12/1407; H04L 12/14; H04M 15/00; H04M 15/8016; H04M 15/8033; H04M 15/8038; H04M 15/66
USPC ........................................................ 455/406
See application file for complete search history.

(56) References Cited

U.S. PATENT DOCUMENTS

| | | | |
|---|---|---|---|
| 11,076,437 B1 | 7/2021 | Velusamy et al. | |
| 2014/0259012 A1* | 9/2014 | Nandlall ............. | G06F 9/45558 |
| | | | 718/1 |
| 2016/0249255 A1 | 8/2016 | Khawer et al. | |
| 2018/0007212 A1 | 1/2018 | Sirotkin et al. | |
| 2019/0364417 A1 | 11/2019 | Patil et al. | |
| 2020/0169853 A1* | 5/2020 | Tamura ................... | H04W 8/08 |

* cited by examiner

*Primary Examiner* — Huy C Ho
(74) *Attorney, Agent, or Firm* — Polsinelli P.C.

(57) ABSTRACT

Disclosed herein are systems, methods, and computer-readable media for applying differential charging over user plane for DCNR capable UEs. In one aspect, a method includes receiving a session request at a control plane gateway in association with a dual connectivity attachment request by a user equipment to connect to a network, sending a request for tunnel binding IDs to a Policy and Charging Rules Function (PCRF), wherein each of the tunnel binding IDs is associated with one of different types of network access for the user equipment, receiving the tunnel binding IDs from the PCRF, and programming a user plane with the tunnel binding IDs and corresponding charging rules for the different types of network access, the user equipment being charged for data usage using the charging rules and depending on which of the different types of network access is used by the user equipment to connect to the network.

20 Claims, 12 Drawing Sheets

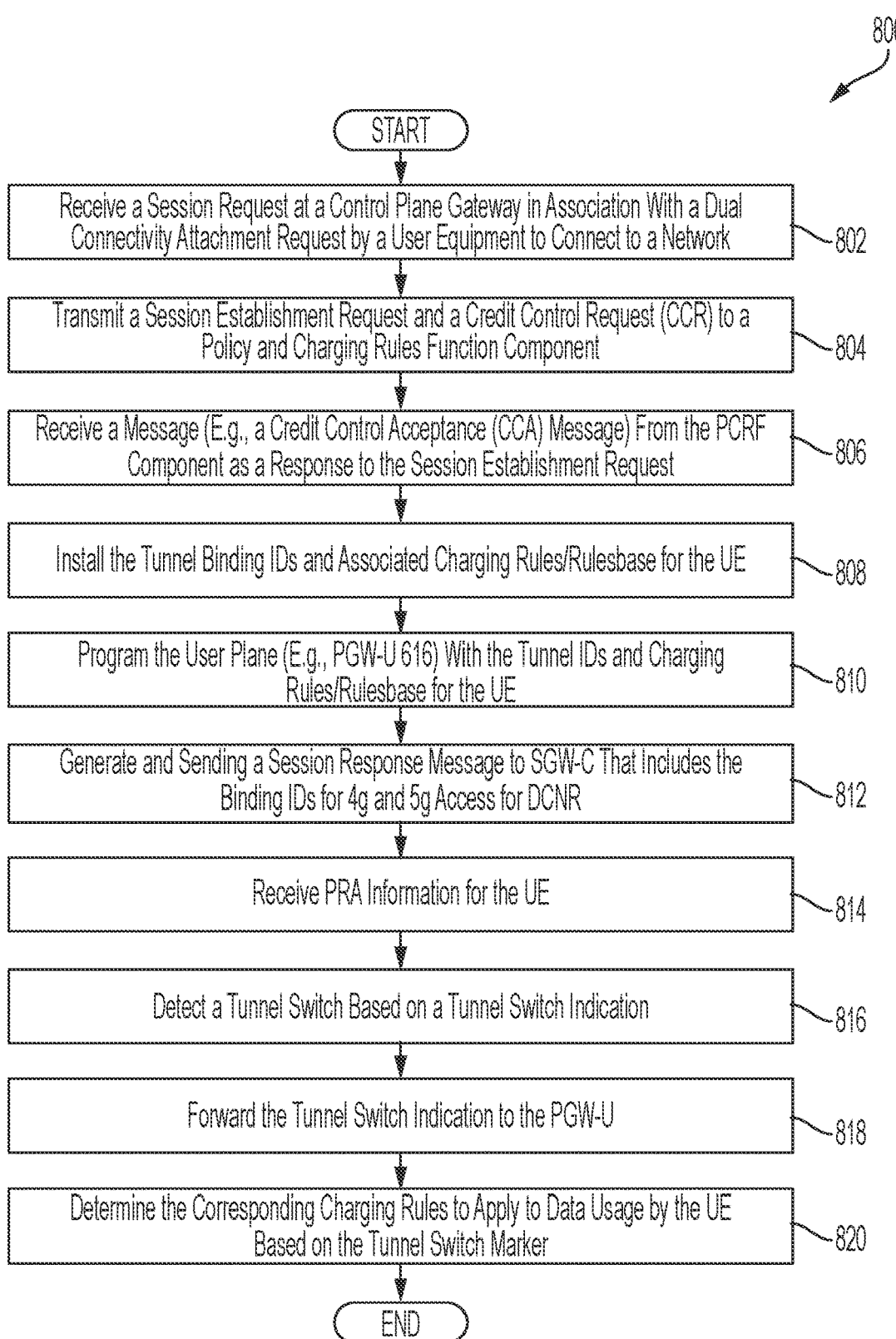

800

START

Receive a Session Request at a Control Plane Gateway in Association With a Dual Connectivity Attachment Request by a User Equipment to Connect to a Network ⟶ 802

Transmit a Session Establishment Request and a Credit Control Request (CCR) to a Policy and Charging Rules Function Component ⟶ 804

Receive a Message (E.g., a Credit Control Acceptance (CCA) Message) From the PCRF Component as a Response to the Session Establishment Request ⟶ 806

Install the Tunnel Binding IDs and Associated Charging Rules/Rulesbase for the UE ⟶ 808

Program the User Plane (E.g., PGW-U 616) With the Tunnel IDs and Charging Rules/Rulesbase for the UE ⟶ 810

Generate and Sending a Session Response Message to SGW-C That Includes the Binding IDs for 4g and 5g Access for DCNR ⟶ 812

Receive PRA Information for the UE ⟶ 814

Detect a Tunnel Switch Based on a Tunnel Switch Indication ⟶ 816

Forward the Tunnel Switch Indication to the PGW-U ⟶ 818

Determine the Corresponding Charging Rules to Apply to Data Usage by the UE Based on the Tunnel Switch Marker ⟶ 820

END

FIG. 8

DIFFERENTIAL CHARGING FOR A USER EQUIPMENT WITH DUAL CONNECTIVITY WITH NEW RADIO (NR) (DCNR) CAPABILITIES

TECHNICAL FIELD

The subject matter of this disclosure generally relates to the field of computer networking and, more particularly, to differential charging for dual connectivity with new radio (NR) (DCNR) capable user equipment.

BACKGROUND

Fifth generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. To support this wide range of services and network functions across an ever-growing base of user equipment (UE), 5G networks incorporate the network slicing concept utilized in previous generation architectures.

Current mobile and wireless communication systems have widely adopted a next-generation wireless communication system, 5G, that provides much higher data rates and lower latency. 5G capable devices are often equipped with dual connectivity capabilities, meaning they can switch between LTE/4G and 5G connectivity. Differential charging is often implemented for data packet transfers to and from a UE over 5G new radio (NR).

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 8 illustrates a flow chart of differential charging for dual connectivity of a DCNR capable UE according to some aspects of the present disclosure;

DETAILED DESCRIPTION

Figure 1A:
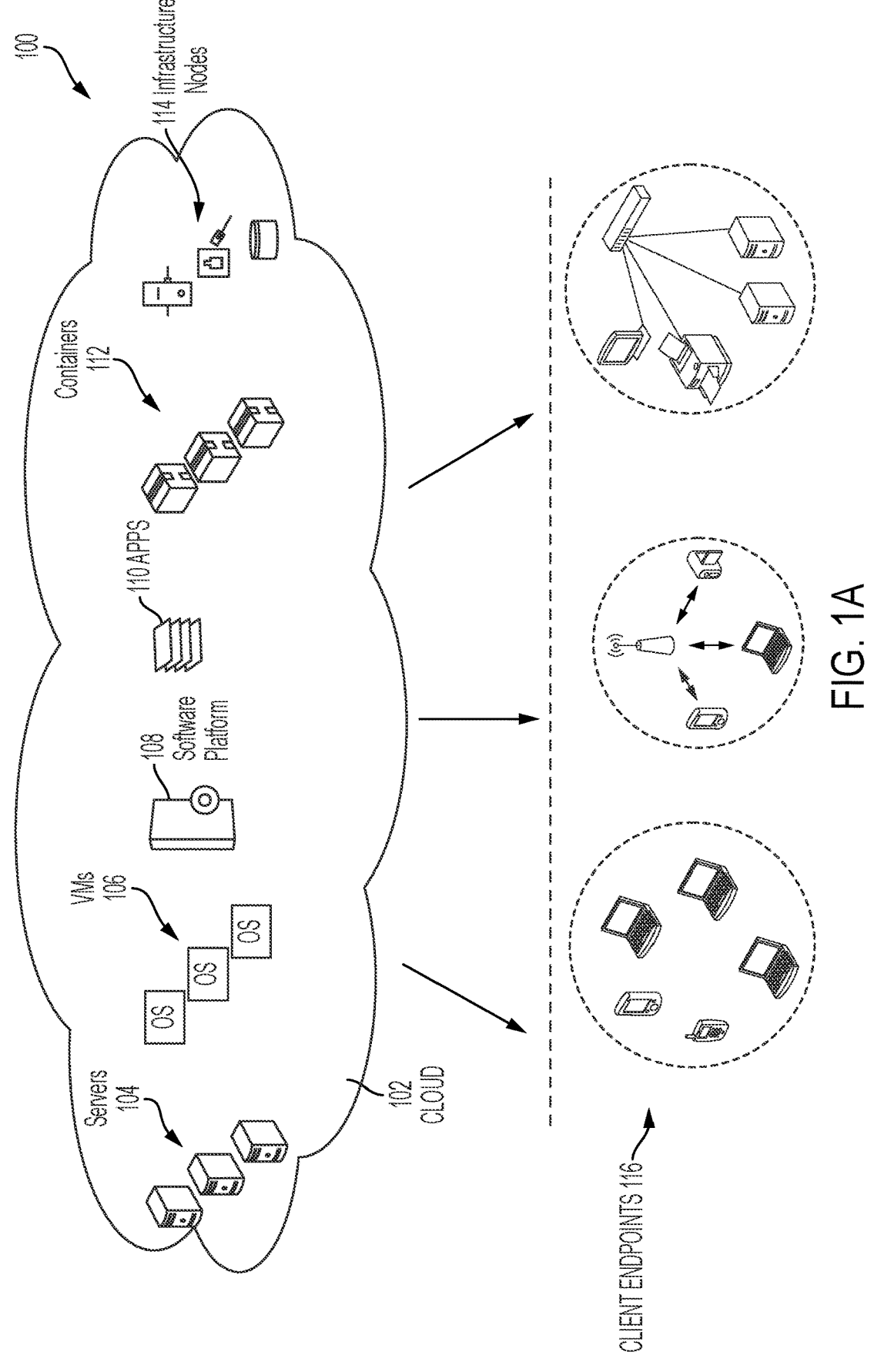
FIG. 1A illustrates an example cloud computing architecture according to some aspects of the present disclosure.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present disclosure is directed to providing a tunnel switch marker for dual connectivity with new radio (NR) (DCNR) capable UEs to facilitate differential charging. More specifically, techniques described herein address the need in the art for identifying tunnel switching between 4G and 5G RAN by introducing a new Tunnel Switch Marker packet on the S1-U interface for each bearer to indicate the Tunnel Switch from 4G LTE to 5G NR and vice versa for that bearer. As will be described, example embodiments of the present disclosure enable the user plane to detect 4G and 5G bearers and hence apply differential charging for 4G and 5G data in the user plane without any control plane signaling, thus increasing performance and system efficiency.

In one aspect, a method includes receiving a session request at a control plane gateway in association with a dual connectivity attachment request by a user equipment to connect to a network, sending a request for tunnel binding IDs to a Policy and Charging Rules Function (PCRF), wherein each of the tunnel binding IDs is associated with one of different types of network access for the user equipment, receiving the tunnel binding IDs from the PCRF, and programming a user plane with the tunnel binding IDs and corresponding charging rules for the different types of network access, the user equipment being charged for data usage using the charging rules and depending on which of the different types of network access is used by the user equipment to connect to the network.

In another aspect, the method further includes receiving, at a P-Gateway (PGW) of the user plane, a tunnel switch marker indicating that the user equipment has switched from a first type of network access to a second type of network access, and determining the corresponding charging rules to apply to data usage by the user equipment based on the tunnel switch marker and the charging rules.

In another aspect, the tunnel switch marker is received using a general packet radio service (GPRS) tunnelling protocol user plane (GTPU) message from a Serving-GW (SGW) of the user plane.

In another aspect, the tunnel switch marker is received in response to a Presence Reporting Area (PRA) indication received from a mobility management entity (MME).

In another aspect, the PRA indication is received in a modify bearer request from the MME triggered when the MME receives a E-UTRAN Radio Access Bearer (E-RAB) modification from a master e-NodeB.

In another aspect, the different types of network access include a 4G access type and a 5G access type.

In another aspect, the session request includes a credit control request (CCR) with a Dual Connectivity New Radio (DCNR) bit set therein.

In one aspect, a device includes one or more memories having computer-readable instructions stored therein, and one or more processors. The one or more processors are configured to execute the computer-readable instructions to receive a session request at a control plane gateway in association with a dual connectivity attachment request by a user equipment to connect to a network, send a request for tunnel binding IDs to a Policy and Charging Rules Function (PCRF), wherein each of the tunnel binding IDs is associated with one of different types of network access for the user equipment, receive the tunnel binding IDs from the PCRF, and program a user plane with the tunnel binding IDs and corresponding charging rules for the different types of network access, the user equipment being charged for data usage using the charging rules and depending on which of the different types of network access is used by the user equipment to connect to the network.

In one aspect, one or more non-transitory computer-readable media include computer-readable instructions, which when executed by one or more processors, cause the one or more processors to receive a session request at a control plane gateway in association with a dual connectivity attachment request by a user equipment to connect to a network, send a request for tunnel binding IDs to a Policy and Charging Rules Function (PCRF), wherein each of the tunnel binding IDs is associated with one of different types of network access for the user equipment, receive the tunnel binding IDs from the PCRF, and program a user plane with the tunnel binding IDs and corresponding charging rules for the different types of network access, the user equipment being charged for data usage using the charging rules and depending on which of the different types of network access is used by the user equipment to connect to the network.

Description of Example Embodiments

Additional features and advantages of the disclosure will be set forth in the description which follows and in part, will be obvious from the description or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

In $4^{th}$ Generation (4G) and $5^{th}$ Generation (5G) Non-Stand Alone (NSA) deployments, user equipment (UEs) with dual connectivity new radio (DCNR) can switch from the 4G/-LTE connectivity (can simply be referred to as the 4G connectivity hereinafter) to the 5G RAN (5G NR) connectivity and vice-versa. Each of the 4G and 5G connectivity can be considered a different Radio Access Technology (RAT). Accordingly, when a DCNR UE starts using the secondary RAT (i.e., 5G) for data transfer, differential charging is to be performed for the packets that are transferred to and from the UE over 5G NR via a secondary gNodeB (gNB). A charging gateway can identify the tunnel switch for data bearers from 4G to 5G and charge the UE accordingly for 5G usage. This enables differential charging for DCNR-capable UEs when they use 5G RAT. Similarly, when the UE switches back to 4G LTE from 5G NR, the charging gateway can detect this tunnel switch and charge the UE for 4G usage only.

In some examples, presence reporting area (PRA) features can assist with identifying when the UE switches back and forth between the 4G to 5G RATs. To enable differential charging, PRA information can be forwarded to a Packet Data Network (PDN) Gateway (PGW) from Serving Gateway (SGW). As a result, the PRA call flow increases signaling across all interfaces (e.g., Mobility Management Entity (MME)/SGW/PGW, Gx interface, etc.). Due to these results, the Control Plane can identify the PRA change for detecting tunnel switches between 4G and 5G radio access networks (RAN), which increases control plane signaling and Gx signaling when the UE moves back and forth between 4G and 5G connectivity. Additionally, Sx signaling in the Sx path between the control plane and the user place in a Control Plane/User Separation Plan (CUPS) deployment is also increased as new rules are pushed from the Policy and Charging Rules Function (PCRF) for a new rating group to be associated with 5G bearers. Thus, when the UE moves frequently between the 4G and 5G connectivity, the PRA as a solution for differential charging introduces a significant cost in terms of performance and throughput.

The disclosed technology addresses the need in the art for identifying tunnel switching between 4G and 5G RAN by introducing a new Tunnel Switch Marker packet on the S1-U interface for each bearer to indicate the Tunnel Switch from 4G/LTE to 5G NR and vice versa for that bearer. As will be described, example embodiments of the present disclosure enable the user plane to detect 4G and 5G bearers and hence apply differential charging for 4G and 5G data in the user plane without any control plane signaling, thus increasing performance and system efficiency.

Prior to describing techniques for differential charging for DCNR capable UEs, one or more examples of enterprise networks/cloud computing infrastructures and 5G networks will be described with reference to FIGS. 1A-B and 2.

FIG. 1A illustrates an example cloud computing architecture according to some aspects of the present disclosure. For example, cloud computing architecture 100 can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102.

The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
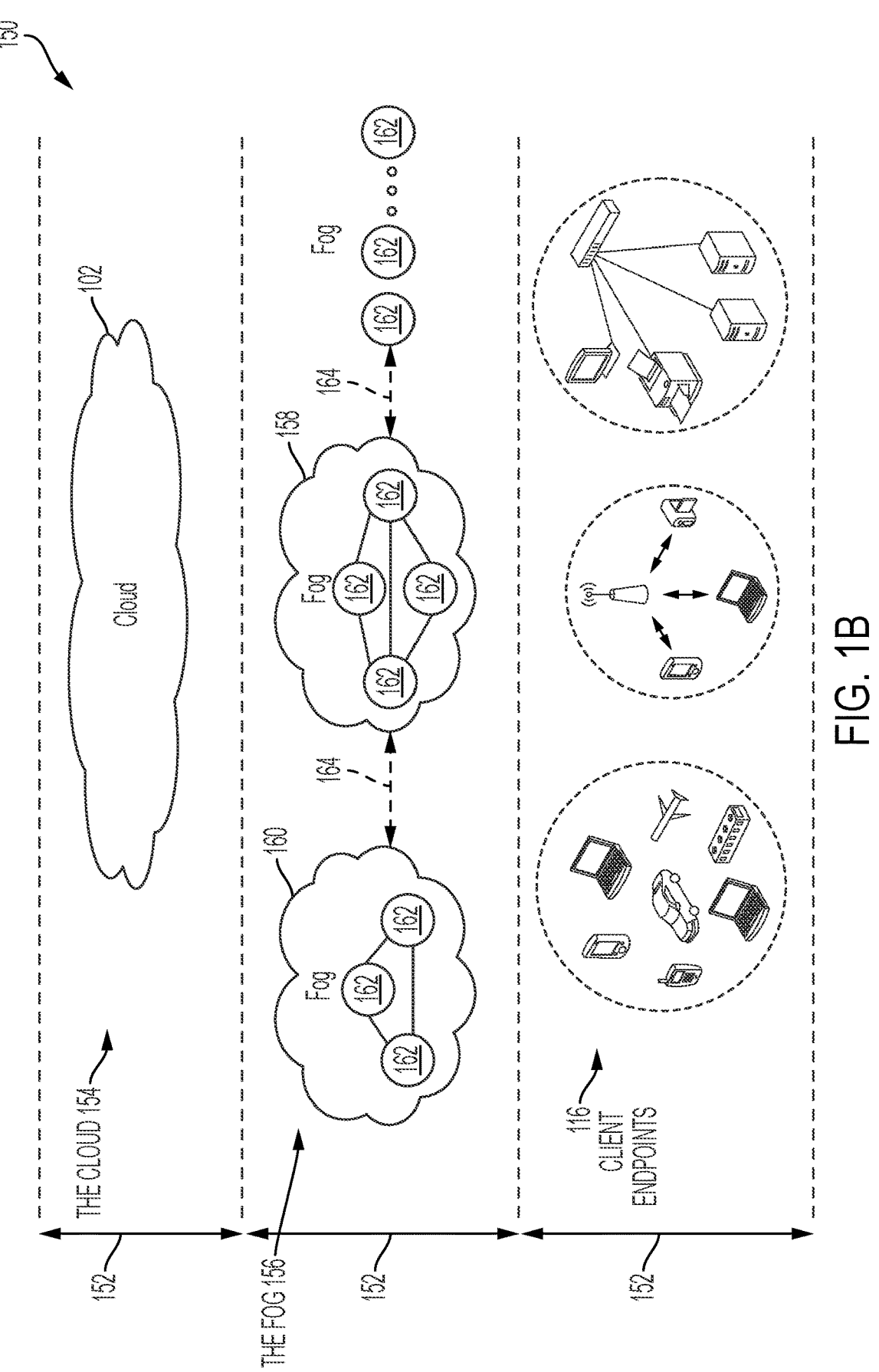
FIG. 1B illustrates an example fog computing architecture according to some aspects of the present disclosure.

FIG. 1B illustrates an example fog computing architecture according to some aspects of the present disclosure. For example, fog computing architecture 150 can be used to form part of a Transmission Control Protocol (TCP) connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, can be local or regional clouds or networks. For example, the fog instances 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node can connect to a particular physical and/or logical connection point with the cloud layer 154 while located at the starting location and switch to a different physical and/or logical connection point with the cloud layer 154 while located at the destination location. The particular fog node can thus move within particular clouds and/or fog instances and, therefore, serve endpoints from different locations at different times.

Figure 2:
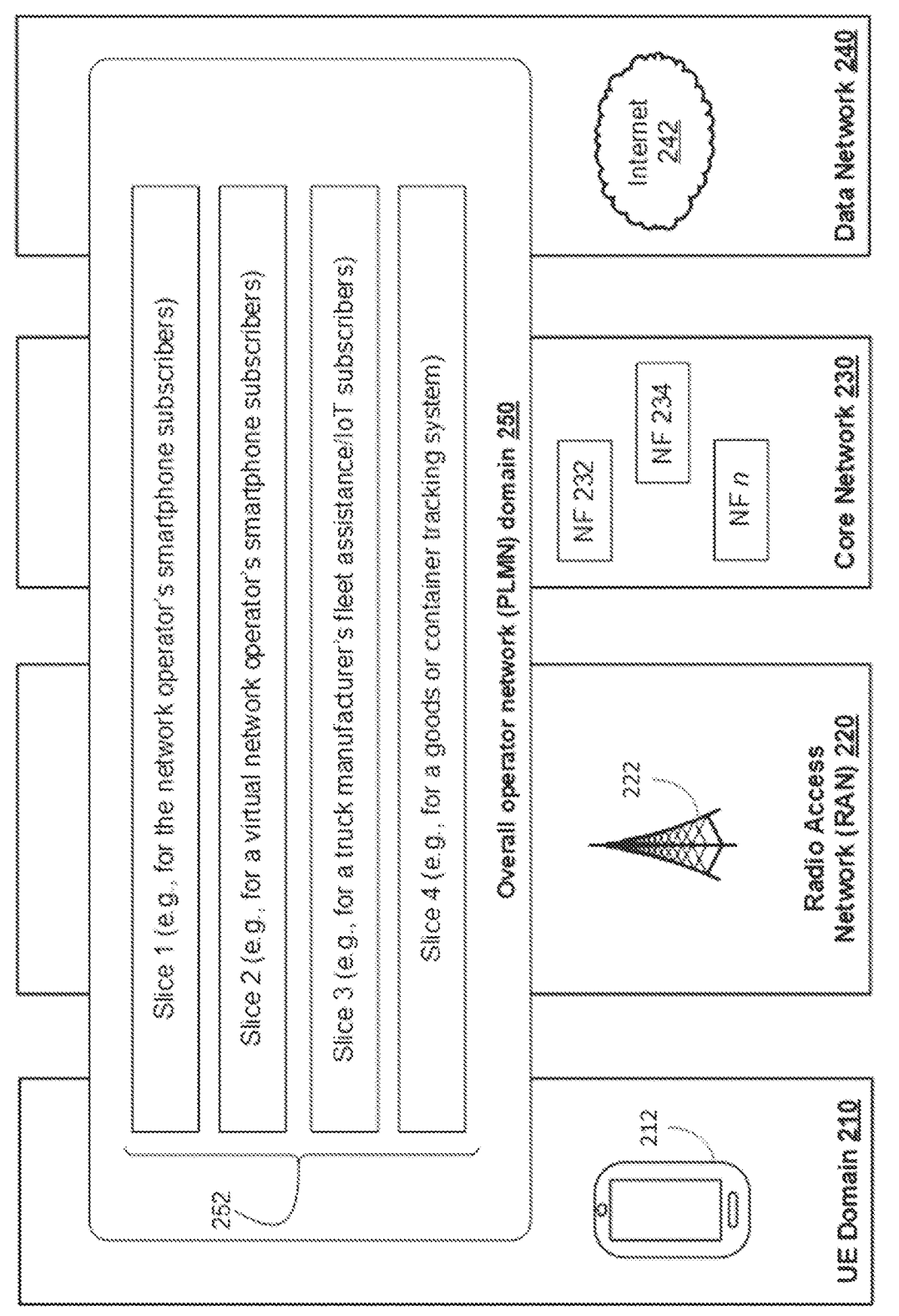
FIG. 2 depicts an exemplary schematic representation of a 5G network environment according to some aspects of the present disclosure.

FIG. 2 depicts an exemplary schematic representation of a 5G network environment according to some aspects of the present disclosure. More specifically, FIG. 2 depicts an exemplary schematic representation of a 5G network environment 200 in which network slicing has been implemented, and in which one or more aspects of the present disclosure can operate. As illustrated, the 5G network environment 200 is divided into four domains, each of which will be explained in greater depth below; a UE domain 210, e.g. of one or more enterprises, in which a plurality of user cellphones or other connected devices 212 reside; a radio access network (RAN) domain 220, in which a plurality of radio cells, base stations, towers, or other radio infrastructure 222 resides; a core network 230, in which a plurality of Network Functions (NFs) 232, 234, . . . , n reside; and a data network 240, in which one or more data communication networks such as the Internet 242 reside. Additionally, the data network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically executes in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: user plane functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing can span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers.

Figure 3:
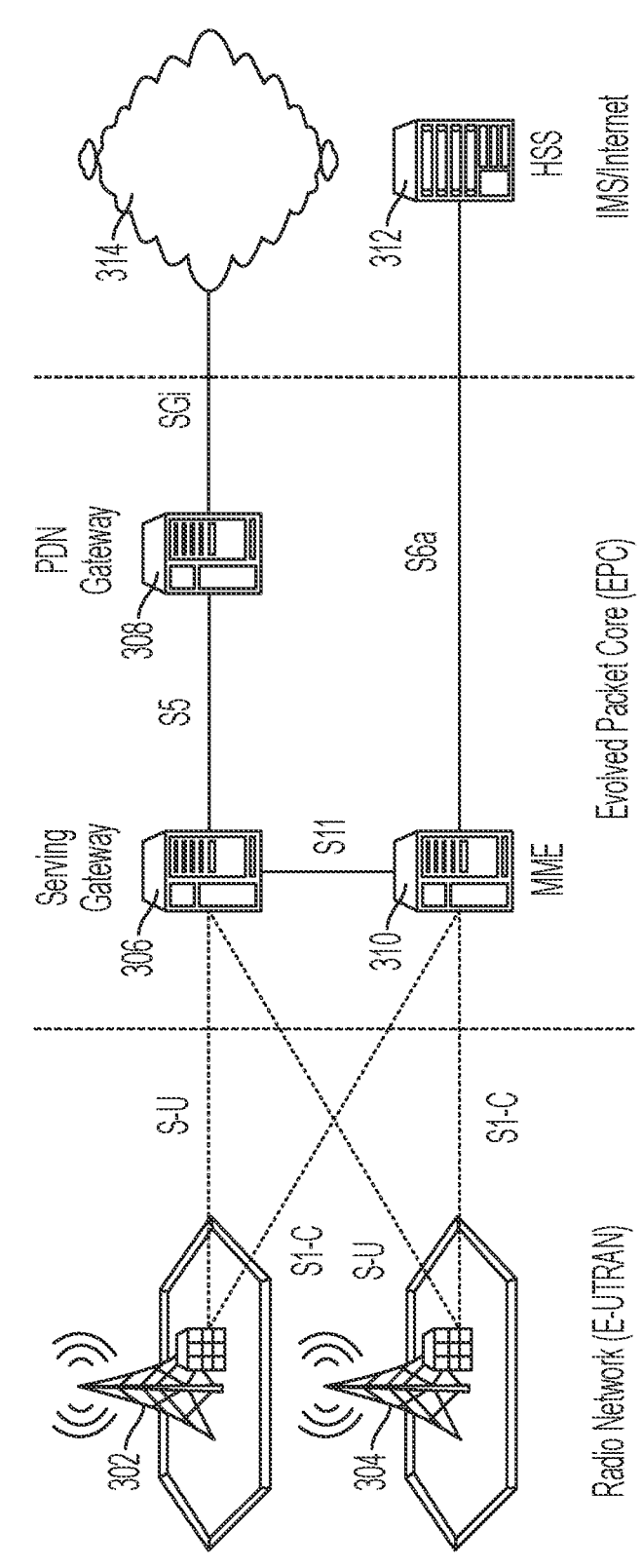
FIG. 3 illustrates an example of a LTE evolved packet core network according to some aspects of the present disclosure.

FIG. 3 illustrates an example of a LTE evolved packet core network according to some aspects of the present disclosure. For example, LTE evolved packet core network 300 can be configured to establish a flat architecture similar to other IP-based communications networks. The network 300 can include, among other known or to be developed components, a radio network on the E-UTRAN that includes a first radio node 302 and a second radio node 304. Each of the first radio node 302 and the second radio node 304 can be configured to each communicate with a SGW 306 and an MME 310 of the evolved packet core (EPC).

The MME 310 can receive signaling from either of the first radio node 302 or the second radio node 304 and can operate as a controller node in an LTE network via control plane signaling (S1-C). The MME 310 can be responsible for tracking connected UEs (not shown in FIG. 3) in idle mode, paging procedures, bearer activation and deactivation processes, SGW 306 selections for a UE at the initial attachment via a S11 interface, handover with core network node relocation, and user authentication with the home subscriber server (HSS) 312 via a Sa-interface. Accordingly, the MME 310 is configured to generate and allocate temporary identities to connected UEs, as well as authorize the UEs for connecting to a public land mobile network (PLMN). The MME 310 can also enforce the restriction of roaming UEs. In some examples, the MME 310 can support control plane functions for mobility between LTE and legacy networks.

The SGW 306 can route and forward user data packets that are received from the first radio node 302 and the second radio node 304 via user plane signaling (S-U). The SGW 306 can further be configured to implement inter-eNB handovers in the user plane and provide mobility between the 4G network and the 5G network, and the PGW 308 (P-GW). Accordingly, the SGW 306 can store context information such as parameters of a plurality of bearers, their routing information, and the UE context when paging happens.

The PGW 308 can be positioned as the connecting node between the UEs via the SGW 306 and external network 314. Thus, the PGW 308 can be configured as an entry point of data traffic for the UEs. In some examples, UEs can connect to several PGWs 308 at the same time where multiple PDNs can need to be accessed. Thus, the PGW 308 provides flexibility and mobility for a UE to switch connectivity between a 4G network and a 5G network.

Figure 4:
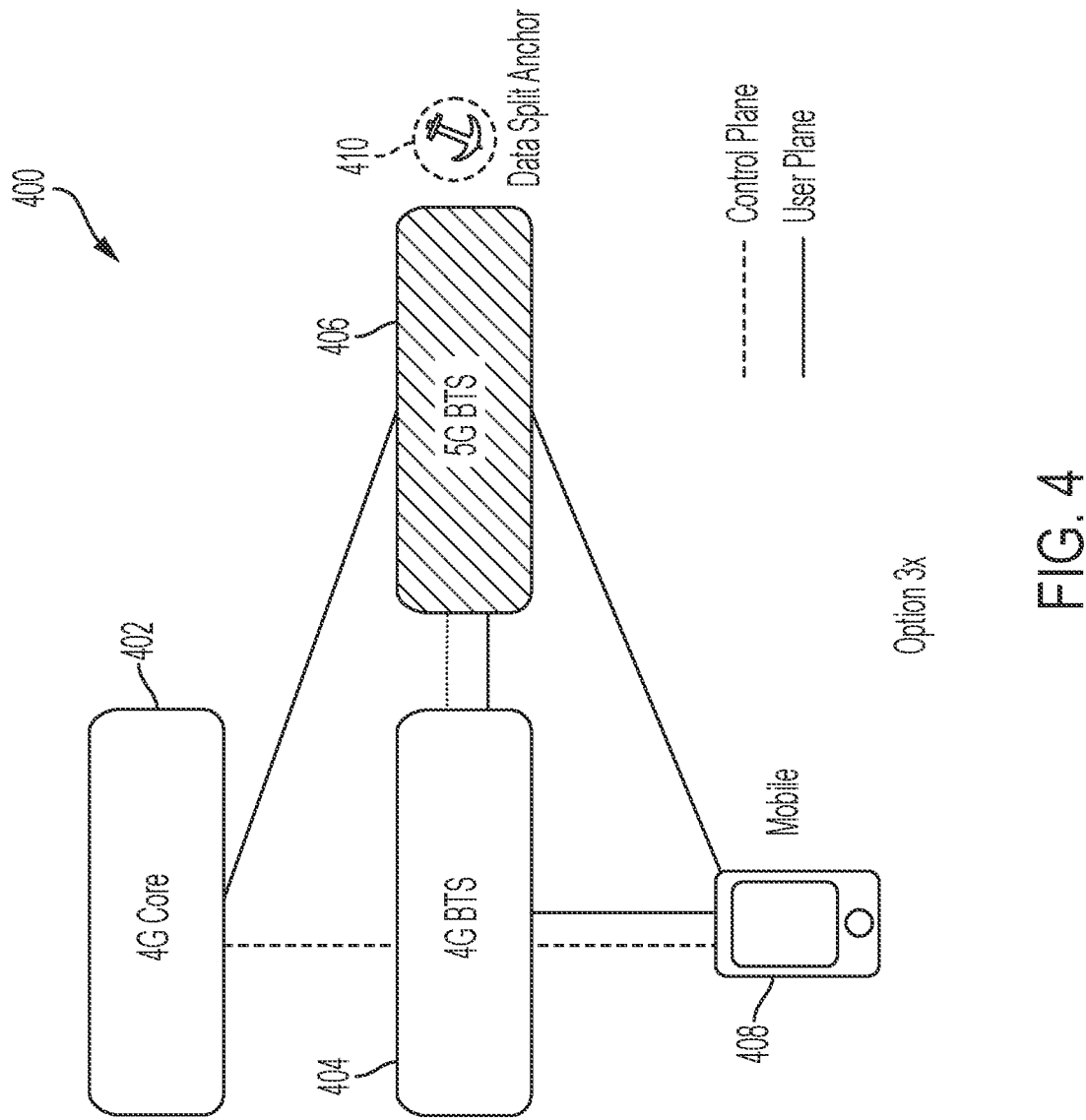
FIG. 4 illustrates an example 5G non-standalone (NSA) deployment model according to some aspects of the present disclosure.

FIG. 4 illustrates an example 5G NSA deployment model 400 according to some aspects of the present disclosure. For example, 5G NSA deployment model 400 can be configured to provide a solution for 5G networks where the network is supported by the existing 4G infrastructure. As illustrated in the non-limiting example of FIG. 4, the 4G Base Transceiver Station (BTS) 404 is connected to the 4G core network 402. Furthermore, each of the 4G core network 402 and the 4G BTS 404 are also connected to the 5G Base Transceiver Station (BTS) 406 (e.g., a gNodeB). A mobile device 408 (which can be the same as any of example UEs and connected endpoint devices described above with reference to FIGS. 1-3) can be configured with dual connectivity capability and can be in communication with each of the 4G BTS 404 and the 5G BTS 406, allowing for the ability to switch between the 4G network serviced by the 4G BTS 404 and the 5G network serviced by the 5G BTS 406. While FIG. 4 illustrates a single mobile device 408 as an example UE, there can be more than one UE attached (connected) to the 5G NSA deployment model 400. Mobile device 408 can be DCNR capable and can be referred to as UE 408 hereinafter.

In this model, representative of an NSA option 3x deployment, a data split anchor functionality 410 can incorporated into the 5G base station 406. Alternatively, another component can be configured to implement the data split anchor functionality 410. The deployment of this model can provide an added advantage of avoiding excessive changes to the 4G BTS 404 and the 4G core network 402 which can already be operational at the time when 5G BTS 406 is added to allow for dual connectivity of the UE 408.

Thus, the data split anchor 410 can provide overall interconnectivity of the networks to take advantage of the fast, efficient, and strong capability of the 5G BTS 406, without requiring a major upgrade to the 4G core network 402. Positioning the data split anchor 410 to interface with the 5G BTS 406 provides for the overall network to have the flexibility to communicate more easily with additional networks, and increases routing efficiency.

In some examples, the 5G BTS 406 is configured to split 4G and 5G bearers. The 5G BTS 406 can forward packets on the 4G bearers to a master eNB (e.g., over user-plane X2 interface) and packets on 5G bearers to be directly delivered to the UE over 5G RAN. Differential charging for DCNR capable UEs 408, can be achieved without involving control plane nodes. The tunnel switch from 4G to 5G RAN or vice-versa can be indicated over the data plane to the user plane gateway via the data split anchor 410. This example provides the ability to circumvent unpredictable traffic in high data traffic networks, where there is frequent toggling between 4G and 5G connectivity on DCNR capable UEs 408.

By introducing of a new Tunnel Switch Marker packet on the S1-U interface for each bearer to indicate the Tunnel Switch from 4G LTE to 5G NR and vice versa for that bearer, the user plane will become aware of the 4G and 5G bearers. Hence, 5G data can be differentially treated or charged by the user plane without any control plane signaling.

Figure 5:
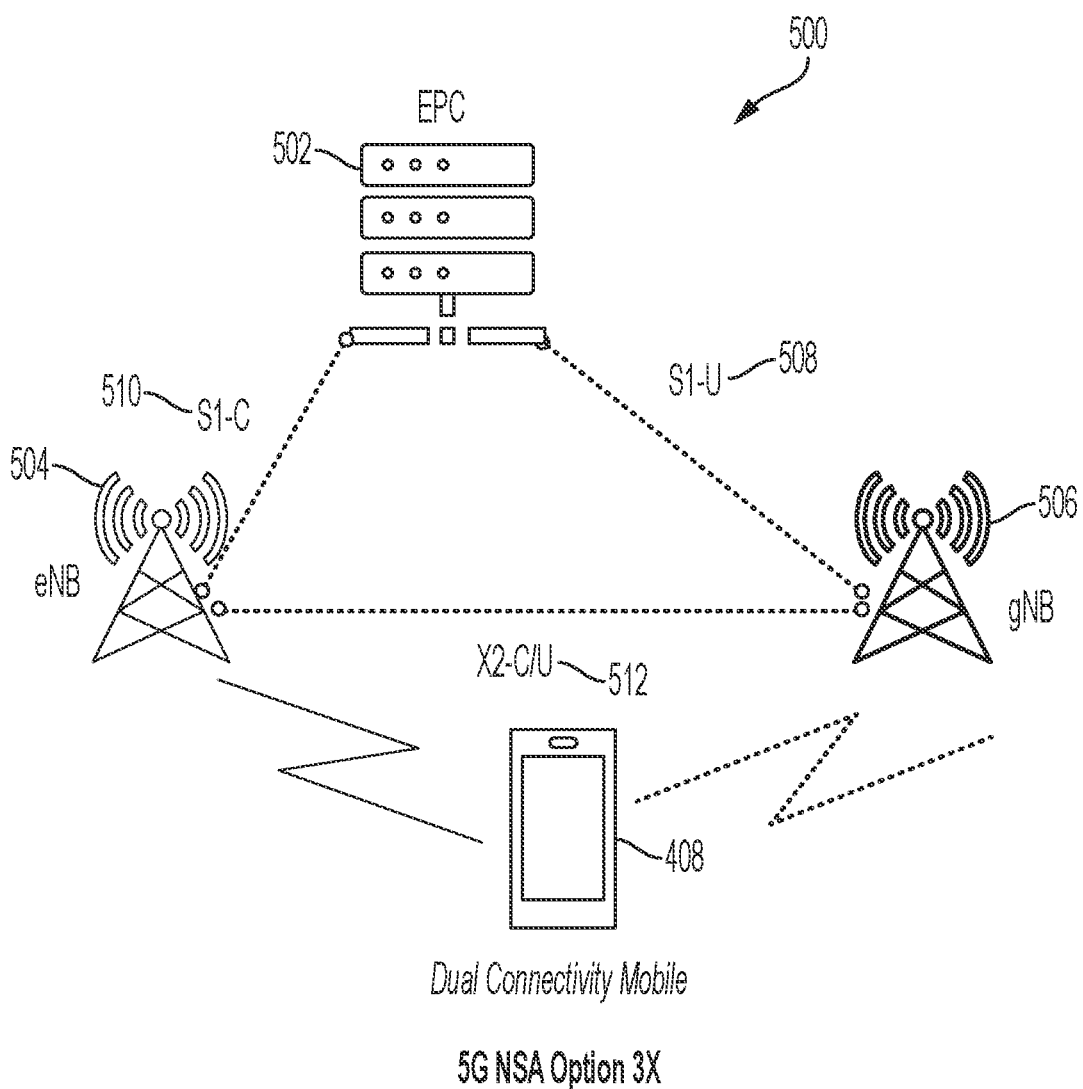
FIG. 5 illustrates an example architecture of 5G non-standalone (NSA) option-3x differential charging according to some aspects of the present disclosure.

FIG. 5 illustrates an example architecture of 5G non-standalone (NSA) option-3× differential charging according to some aspects of the present disclosure. For example, architecture 500 provides an example of LTE-assisted signaling completed through the LTE eNB 504 to the DCNR UE 408. Similarly, 5G assisted signaling can be completed through the gNB 506 to the UE 408.

The example architecture 500 further provides multiple interfaces that allow each of the EPC 502, the eNB 504 and the gNB 506 to provide connectivity to each other. The S1-U interface 508 can be configured to provide user plane connectivity to the evolved packet core (EPC) 502 for the eNB 504 and the gNB 506. The S1-C interface 510 can be configured to provide control plan signaling connectivity to the EPC 502 for the eNB 504 and the gNB 506. The X2-C/U interface 512 can be configured to provide user plane and control plane connectivity between the eNB 504 and the gNB 506. Specifically, the X2-C, can represent the control plane connectivity between the eNB 504 and the gNB 506. Similarly, the X2-U, can represent the user plane connectivity between the eNB 504 and the gNB 506.

In 5G NSA deployments, as illustrated in FIG. 4, a tunnel switch marker packet can be implemented and communicated on the S1-U interface to indicate a bearer switch from 4G to 5G NR or vice-versa to the user plane gateway to identify 4G/5G bearers for enforcing differential charging for the 5G usage on UE 408. The charging bundle to be used on the data plane for 4G or 5G access can be identified using tunnel binding ID. The tunnel switch maker packet can be sent out on the GTPU tunnel during the path update procedure, where the tunnel binding ID is sent in the packet. The GTPU packet types can be as follows:

| Payload size | Encapsulated data checks | IE checks | Header extension checks | Optional HEADER check If E, S or PN = 1 | GTP mandatory header checks | | | | | |
|---|---|---|---|---|---|---|---|---|---|---|
| | | | | | Length | TEID | Spare | PT | Version | |
| >0 | PayloadSize is assumed to be the size of the remainder of the packet, unless the packet is fragmented No checking of the encapsulated data | No checks | Valid types = Service Class Indicator and PDCP PDU Number Extension size = 4*# of extensions | Optional Size = 8 IF E = 0, ExtSize = 0 | Optional Size + Extension Size + Payload Size | <>0 | 0 | 1 | 1 | G-PDU (Encapsulated Data Delivery) - Message Type 255 |
| | No payload after the IEs | Only private extensions are allowed. | No external header allowed. | No option headers allowed. | IE Size | 0 | 0 | 1 | | Echo Request - Message Type 1 |
| | No payload after the IEs | Recovery ID is present Private extensions allowed. | No external header allowed. | No option headers allowed. | IE Size | 0 | 0 | 1 | 1 | Echo Response - Message Type 2 |
| | No payload after the IEs | Extension Header Type List IE is present Private extensions allowed No checking on the extension header value | No external header allowed. | No option headers allowed. | IE Size | 0 | 0 | 0 | 1 | Supported Extension Headers Notification - Message Type 31 |
| | No payload after the IEs | TEID IE and GTP-U Peer Address IE are present IE type and length are verified Private extensions allowed | Only the UDP Port Extension Header is valid | Optional Size = 8 | Optional Size + Extension Size + IE Size | <>0 | 0 | 1 | 1 | Error Indication - Message Type 26 |
| | No payload after the IEs | Only Private extensions are allowed | no valid external header allowed. | Optional Size = 8 IF E = 0, ExtSize = 0 | IE Size | <>0 | 0 | 1 | 1 | End Marker - Message Type 254 |
| | No payload after the IEs | Only Private extensions are allowed | no valid external header allowed. | Optional Size = 8 IF E = 0, ExtSize = 0 | IE Size | <>0 | 0 | 1 | 1 | Tunnel Switch Marker - Message type 253 |

In some examples, the tunnel switch marker packet can indicate a tunnel switch to 5G for indicating bearer movement from 4G LTE to 5G NR. Any packets on this bearer can be transferred to and from the UE 408 over 5G New Radio by a secondary gNB that is responsible for sending the tunnel switch marker packet on the S1-U interface towards the user plane for the 5G bearers.

In some examples, the tunnel switch marker packet can indicate a tunnel switch to a 4G network, and subsequent bearer movement from 5G NR to 4G. Accordingly, any packets on this bearer can be transferred to and from the UE 408 over 4G. Thus, the master node, which is the 5G BTS 406 as illustrated in FIG. 4, would be responsible for sending the tunnel switch marker packet on the S1-U interface toward the user plane for the 4G bearers.

Furthermore, in 5G NSA deployments such as FIG. 4, a charging gateway can be utilized to pre-install charging rules, with different rating groups, for 4G and 5G bearers to provide differential charging for 5G NR during the attach procedure for UE 408. The process for the installation of pre-install charging rules through a tunnel binding identification (ID) is illustrated in FIGS. 6A-B.

Figure 6A:
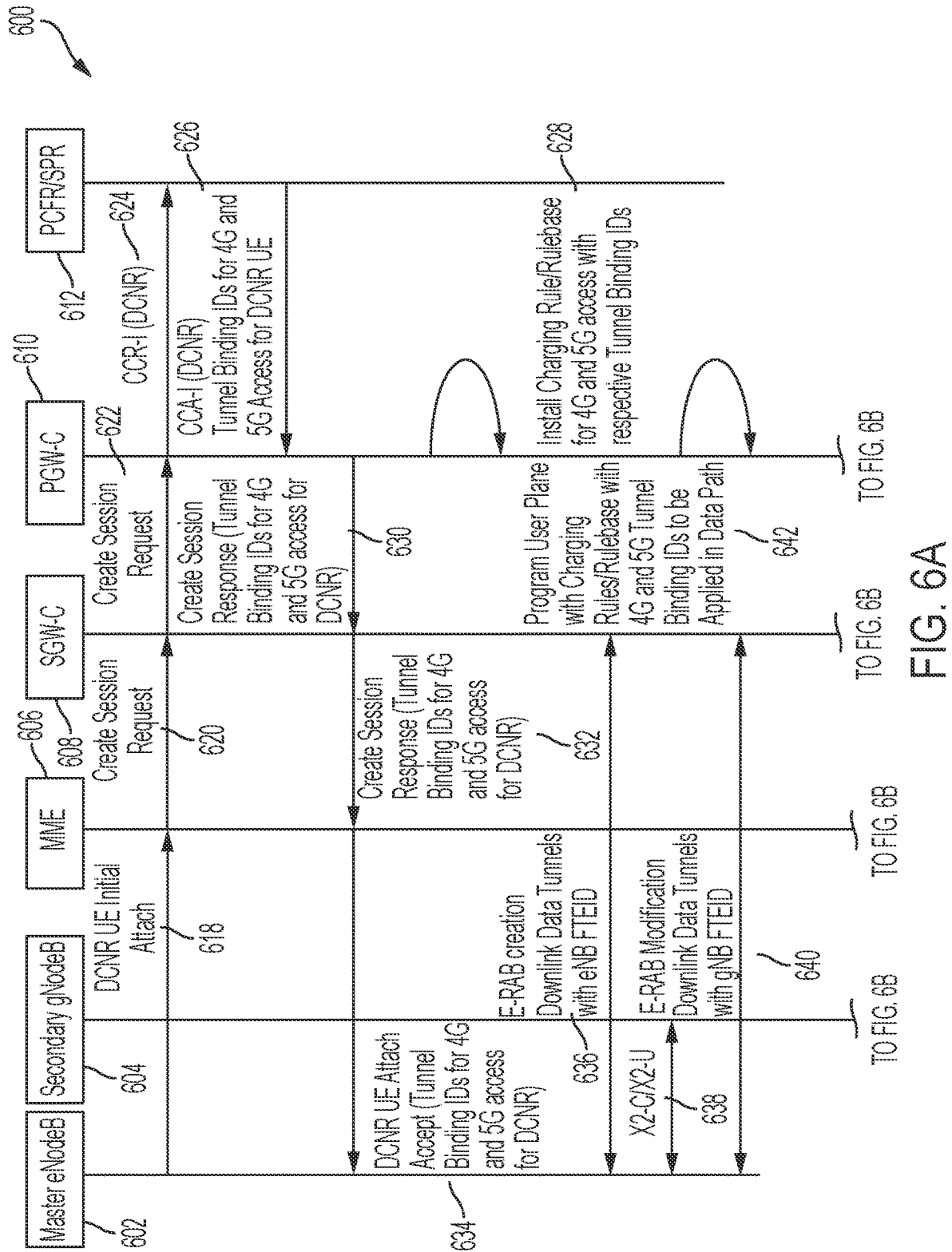
FIGS. 6A-B illustrates a communication diagram for the Tunnel Binding ID installation for 4G and 5G access for Dual Connectivity with New Radio (DCNR) according to some aspects of the present disclosure.
Figure 6B:
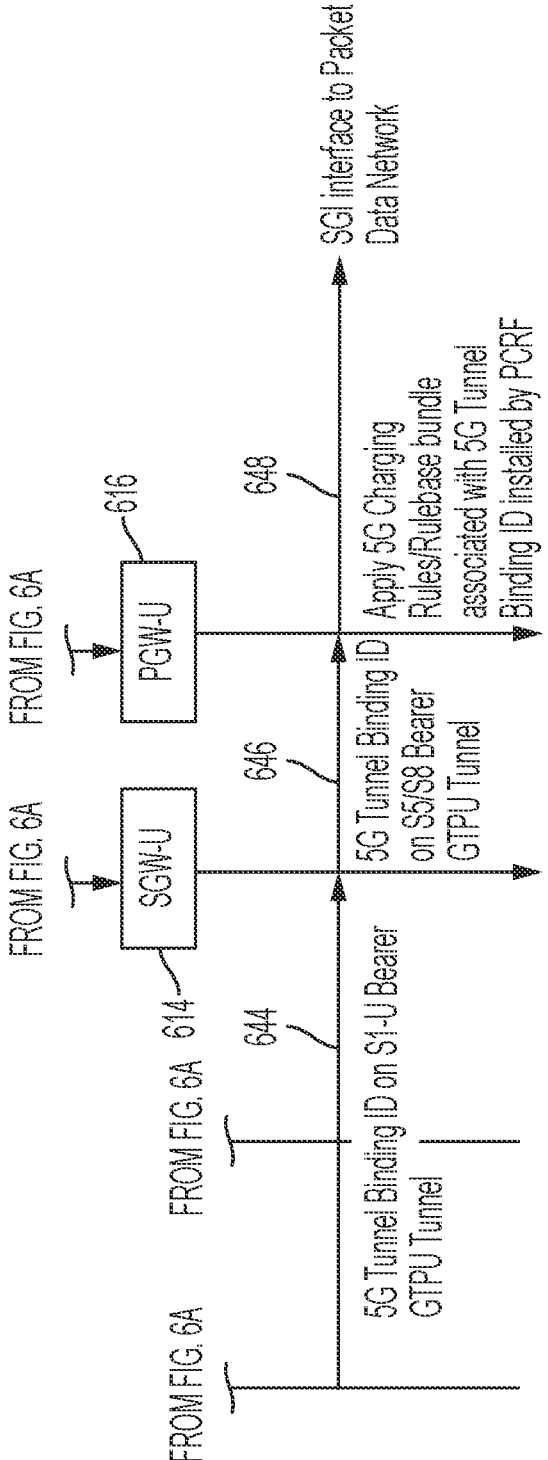

FIGS. 6A-B illustrate a communication diagram for the Tunnel Binding ID installation for 4G and 5G access for DCNR according to some aspects of the present disclosure.

According to example flow 600, at step 618, the master eNB 602 may initiate a DCNR initial attach with the MME 606.

At step 620, the MME 606 may transmit a create session request (CSR) to the Control plane SGW (SGW-C) 608.

At step 622, the SGW-C 608 may transmit the CSR to the PGW-C 610.

At step 624, upon receiving the CSR from the SGW-C 608, the PGW-C 610 may send a CCR-I to PCFR with DCNR bit set.

At step 626, the PCFR/SPR 612 may respond with tunnel binding IDs for 4G and 5G access along with relevant charging rules/rulebase for the UE 408.

At step 628, the PGW-C 610 may install the tunnel binding IDs and the charging rules at the PGW-C 610.

At step 630, the PGW-C 610 may send a create session response to the SGW-C 608. The create session response can include the tunnel binding IDs for 4G and 5G access for DCNR.

At step 632, the SGW-C 608 may transmit the create session response and the tunnel binding IDs to the MME 606.

At step 634, MME 606 may create and transmit a DCNR UE attach acceptance message to the MeNB 602. The DCNR initial acceptance can include the tunnel binding IDs.

At step 636, the SGW-C 608 and MeNB 602 may create and exchange an E-UTRAN Radio Access Bearer (E-RAB), including the downlink data tunnels with MeNB 602 fully qualified terminal endpoint identifier (FTEID).

At step 638, the MeNB 602 may establish a connection with the secondary gNB (SgNB) 604 using an X2 interface over the user plane and/or the control plane. This step can be triggered by a switch from 4G access type to 5G access type or vice-versa, by the UE 408.

At step 640, the SGW-C 608 and MeNB 602 may create and exchange an E-UTRAN Radio Access Bearer (E-RAB) modification (to indicate the switch from one of the 4G and 5G access types to the other by the UE 408) including the downlink data tunnels with SgNB 604 FTEID.

At step 642, the PGW-C 610 may program the user plane (e.g., PGW-U 616) with the tunnel binding IDs for 4G and 5G along with relevant charging rules/rulebase for the UE 408 to apply differential charging in the user plane.

Thereafter, at step 644, the SgNB 604 may transmit a 5G tunnel binding ID in a 5G bearer on the S1-U interface over a GTPU tunnel to the SGW-U 614. In a similar manner and when the UE 408 is switching back to 4G access from an existing 5G access, the MeNB 602 can transmit a 4G tunnel binding ID to the SGW-U 614.

At step 646, the SGW-U 614 may transmit the tunnel binding ID received from the SgNB 604 (or from the MeNB 602) to the PGW-U 616. For example, the SGW-U 614 can send the tunnel binding ID on the GTPU S5 and/or S8 tunnels towards the PGW-U 616.

Accordingly, at step 648, the PGW-U 616 may apply the corresponding 5G charging rules for the 5G tunnel ID (or the corresponding 4G charging rules for 4G tunnel ID) received via the SGI interface in the packet data network using the charging rules with which PGW-C 610 programmed the PGW-U 616 at step 630.

In summary, at steps 644, 646, and 648, with the user plane being pre-programmed with charging rules/rulebase for 4G and 5G bearers, the 4G and/or 5G bearer tunnel switch is detected on the S1-U using the relevant tunnel switch marker packet, on a per bearer level. This in turn allows the user plane (e.g., PGW-U 616) to apply the rules pre-configured for the detected bearer. Accordingly, differential charging of the 4G and 5G bearers can be achieved using data plane signaling without the need for additional control plane signaling, resulting in a reduction of control plane signaling.

Figure 7:
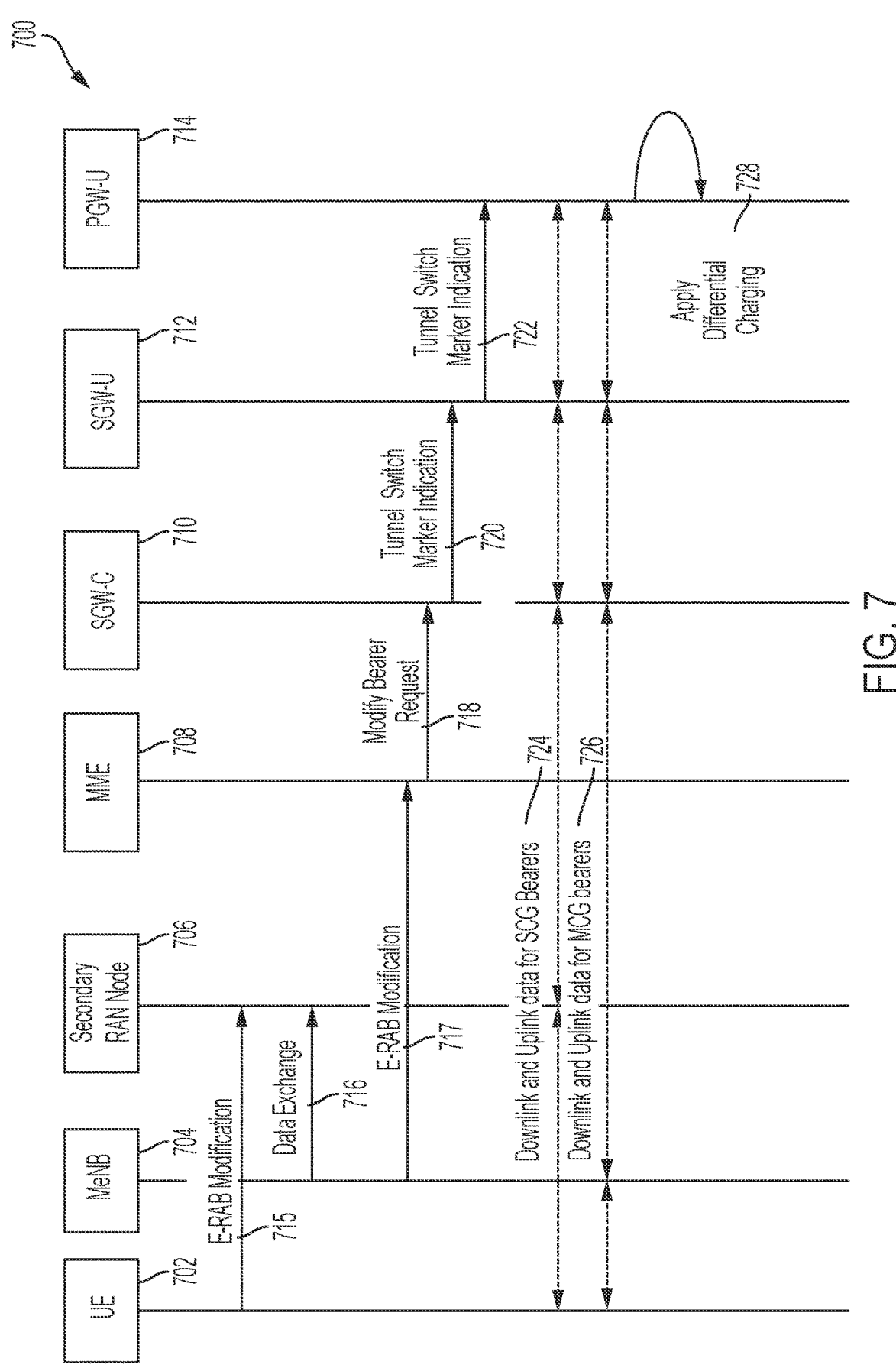
FIG. 7 illustrates an example of 5G non-standalone (NSA) differential charging according to some aspects of the present disclosure.

FIG. 7 illustrates an example communication diagram for 5G non-standalone (NSA) differential charging according to some aspects of the present disclosure. FIG. 7 in some examples can be implemented as an alternative to or in combination with the differential charging process of FIGS. 6A-B. As will be described below, the example process 700 of FIG. 7 can leverage existing PRA signaling from an MME to an SGW-C with the tunnel switch marker, as described with respect to FIGS. 5 and 6 on the user plane to enhance the differential charging for 5G NSA users.

UE 702 can be the same as UE 408 described above. MeNB 704 can be the same as MeNB 602 of FIGS. 6A-B. Secondary RAN node 706 can be the same as SgNB 604 of FIGS. 6A-B. MME 708 can be the same as MME 606 of FIGS. 6A-B. SGW-C 710 can be the same as SGW-C 608 while SGW-U 712 can be the same SGW-U 614 of FIGS. 6A-B. PGW-U 714 can be the same as PGW-U 616 of FIGS. 6A-B.

At step 715, the UE 702 may send an E-RAB modification to the secondary RAN Node 706. The E-RAB modification can further include the addition, modification, and/or release of a secondary cell group (SCG).

At step 716, the MeNB 704 may perform a data exchange (e.g., data forwarding per 3GPP with secondary RAN node 706.

At step 717, the MeNB 704 may send a E-RAB modification indication to the MME 708. In one example, the MME 708, using the IP address of the MeNB 704 may determine the PRA information and send the same to the SGW-C 710 (e.g., in a modify bearer request per step 718 described below.

At step 718, the MME 708 may send a modify bearer request to the SGW-C 710. In one example, the modify bearer request can include a value set for IN-PRA/OUT-PRA parameter in the E-RAB modification request. The processes at steps 720, 722, 724, and 726 can be performed per existing 3GPP specification.

Upon receiving the modify bearer request, at step 720, the SGW-C 710 may send a tunnel switch marker indication to the SGW-U 712. The tunnel switch maker indication can include the corresponding 4G or 4G binding tunnel ID.

In response, at step 722, the SGW-U 712 may send the tunnel switch marker on the GTPU S5 and/or S8 tunnels towards the PGW-U 714.

At step 724, the SGW-U may receive downlink and uplink data for secondary cell group (SCG) bearers from the UE 702. The SCG bearers can be transmitted from the UE 702, to the secondary RAN Node 706. The secondary RAN node 706 can then transmit the SCG bearers to the SGW-U 712 to be transmitted to the PGW-U 714.

At step 726, the SGW-U may receive downlink and uplink data for master cell group (SCG) bearers from the UE 702. The MCG bearers can be transmitted from the UE 702, to the MeNB 704. The MeNB 704 can then transmit the MCG bearers to the SGW-U 712 to be transmitted to the PGW-U 714.

At step 728, in response to receiving the MCG and SCG bearers, the PGW-U 714 may apply the corresponding differential charging for each 4G/5G bearers in the SCG and MCG in the same manner as described above with reference to step 644 of FIGS. 6A-B.

FIG. 8 illustrates a flow chart of differential charging for dual connectivity of a DCNR capable UE according to some aspects of the present disclosure FIG. 8 illustrates an example method 800 for differential charging via a tunnel switch marker for DCNR capable UEs.

Although the example method 800 depicts a particular sequence of operations, the sequence can be altered without departing from the scope of the present disclosure. For example, some of the operations depicted can be performed in parallel or in a different sequence that does not materially affect the function of the method 800. In other examples, different components of an example device or system that implements the method 800 can perform functions at substantially the same time or in a specific sequence.

At step 802, the method includes receiving a session request at a control plane gateway in association with a dual connectivity attachment request by a user equipment to connect to a network. For example, the PGW-C 610 illustrated in FIGS. 6A-B can receive a session request in association with a dual connectivity attachment request by UE 408 to connect to a network 200.

In one example, the session request can be triggered in response to a dual connectivity attachment request from a MeNB (e.g., MeNB 602 of FIGS. 6A-B) to connect to an MME of a network (e.g., network 200). For example, the MME 606 illustrated in FIGS. 6A-B can receive a dual connectivity attachment request from the MeNB 602 to connect to the MME 606 of network 200. The different types of network access can include a 4G access type and a 5G access type. While 4G and 5G are discussed as two example types of network access, the present disclosure is not limited thereto and can include other types of network access as well. This step can be performed as described above with reference to steps 618-622 of FIGS. 6A-B.

At step 804, the method includes transmitting a session establishment request and a credit control request (CCR) to a Policy and Charging Rules Function (PCRF) component (e.g., PCRF/SPR 612 (hereinafter, can simply be referred to as PCRF 612)). In one example, this request can be sent with a DCNR bit set in the CCR. In one example, the PGW-C 610 illustrated in FIGS. 6A-B can send a request for tunnel binding IDs to the PCRF 612. Each of the tunnel binding IDs can be associated with one of different types of network access for the user equipment. This step can be performed in a similar manner as described above with reference to step 624 of FIGS. 6A-B.

At step 806, the method includes receiving a message (e.g., a credit control acceptance (CCA) message) from the PCRF 612 as a response to the session establishment request. In one example, as part of the CCA message, PGW-C 610 can receive the tunnel binding IDs for the 4G and 5G access along with corresponding charging rules/rulebase for UE 408. This step can be performed in a similar manner as described above with reference to step 626 of FIGS. 6A-B.

At step 808, and upon receiving the CCA message, the method includes installing the tunnel binding IDs and associated charging rules/rulebase for the UE 408, on PGW-C 610.

At step 810, the method includes programming the user plane (e.g., PGW-U 616) with the tunnel IDs and charging rules/rulebase for the UE 408. In one example, PGW-C 610 can program PGW-U 616 with the tunnel binding IDs and corresponding charging rules/rules base for the UE 408. Upon being programmed, and as will be described below, PGW-U 616 can apply differential charging to data packets send to and from the UE 408 depending on the UE's 408 access type (e.g., over a 4G connection or a 5G connection) after detecting the corresponding 4G or 5G binding ID in the data path.

At step 812, the method includes generating and sending a session response message to SGW-C 608 that includes the binding IDs for 4G and 5G access for DCNR as received from the PCRF 612. For example, PGW-C 610 can generate and send the session response message to the SGW-C 608. The SGW-C 608 can then forward the session response message to the MME 606.

In one example and upon receiving the session response message, the MME 606 can complete the DCNR attach request for the UE 408 by generating and transmitting a DCNR UE attach accept message to the MeNB 602. The UE attach accept message can include the 4G/5G tunnel binding IDs.

In one example, the order of steps 810 and 812 can be reversed.

Thereafter and once the user plane is programmed with relevant 4G/5G biding IDs and corresponding charging rules for the UE 408 to apply differential charging in the data path, a series of steps may be implemented to detect a change from 4G access type to 5G access type by the UE 408 and vice-versa in order to apply the different charging. These steps can correspond to steps 632-644 described above with reference to FIGS. 6A-B and hence will not be further described.

In one example, step 814 can optionally be performed. At step 814, the method includes receiving PRA information for the UE 408. For example, and as described above with reference to FIG. 7, MME 708 can provide the PRA information to be used in conjunction with binding tunnel IDs to apply differential charging.

At step 816, the method includes detecting a tunnel switch based on a tunnel switch indication. For example, either MeNB 602 or the SgNB 604 can provide the tunnel switch marker to the SGW-U 614 in a similar manner as described above with reference to step 646 of FIGS. 6A-B. In another example, the tunnel switch indication can be provided to the SGW-U 614 in response to receiving the PRA information from the MME 708 by the SGW-C 710, as described above with reference to FIG. 7.

At step 818, the method includes forwarding the tunnel switch indication to the PGW-U 616 as described above with reference to step 648 of FIGS. 6A-B. For example, the SGW-U 614 can send the tunnel switch marker on the GTPU S5 and/or S8 tunnels towards the PGW-U 616.

At step 820, the method includes determining the corresponding charging rules to apply to data usage by the UE based on the tunnel switch marker. For example, the PGW-U 616 can determine the corresponding charging rules to apply to data usage by the UE 408 based on the tunnel switch marker received from SGW-U 614 at step 818. This example can be performed as described above with reference to step 650 of FIGS. 6A-B.

Figure 9:
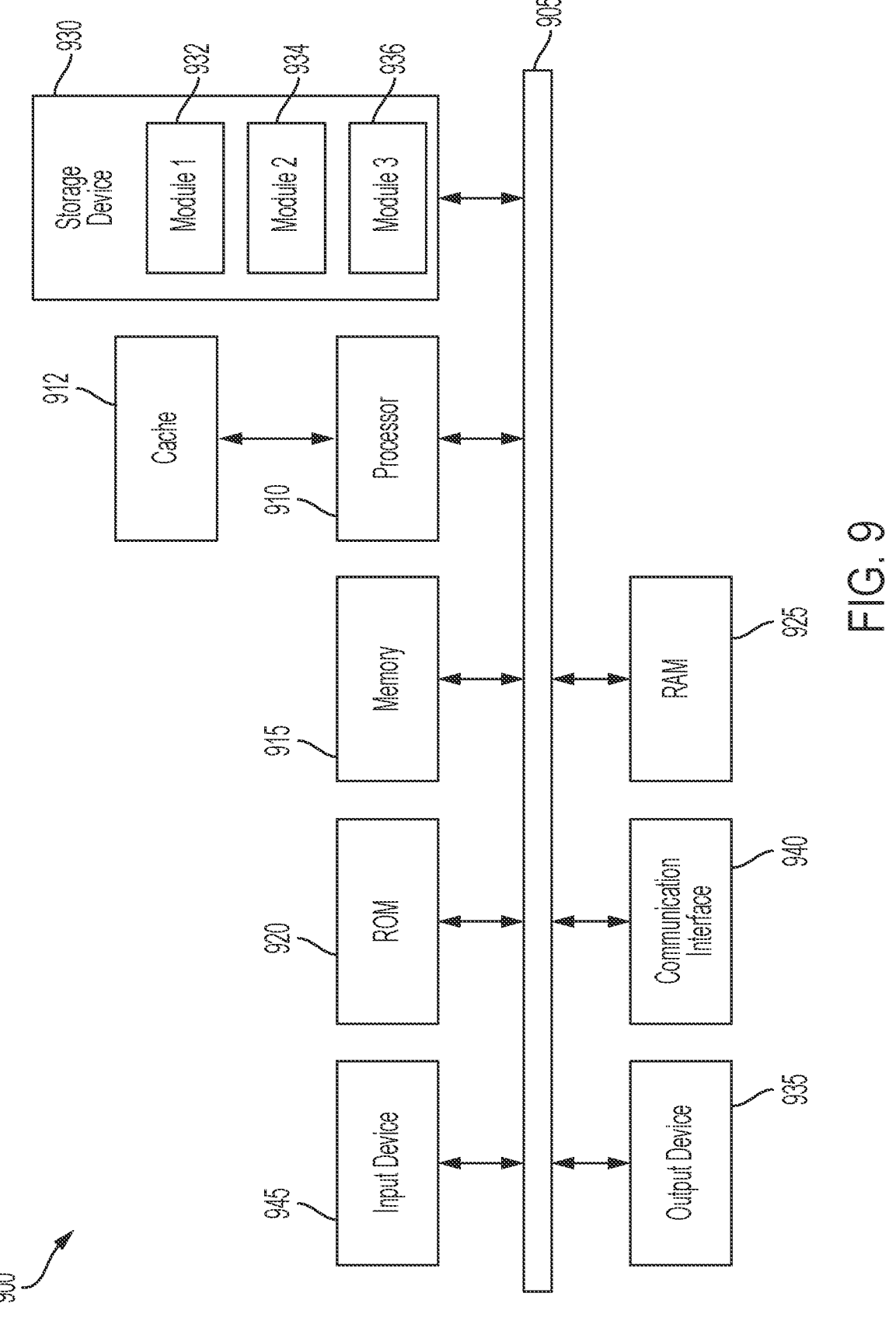
FIG. 9 illustrates an example network device according to some aspects of the present disclosure.

FIG. 9 illustrates an example network device according to some aspects of the present disclosure. Example of computing system 900 of FIG. 9 can be used to implement one or more component of the example systems and architectures described above with reference to FIGS. 1-8. Connection 905 can be connection connecting various components of the computing system 900. For example, connection 905 can a physical connection via a bus, or a direct connection into processor 910, such as in a chipset architecture. Connection 905 can also be a virtual connection, networked connection, or logical connection.

In some embodiments computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 can essentially be a completely self-contained computing system, containing multiple cores or processors, a bus, memory controller, cache, etc. A multi-core processor can be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement and therefore the basic features here can easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Figure 10:
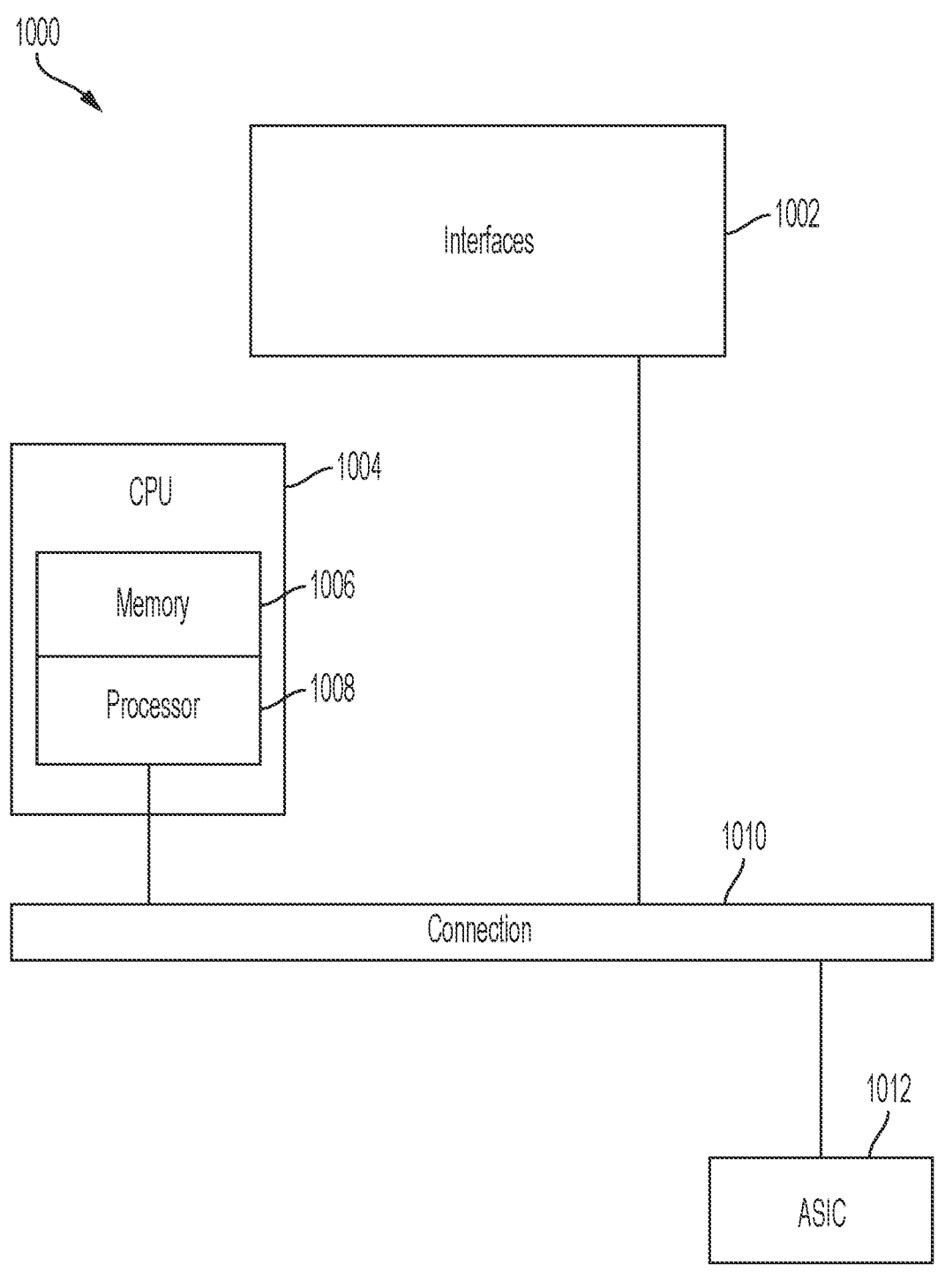
FIG. 10 shows an example of a computing system according to some aspects of the present disclosure.

FIG. 10 illustrates an example network device 1000 suitable for performing switching, routing, load balancing, and other networking operations. The example network device 1000 can be implemented as switches, routers, nodes, metadata servers, load balancers, client devices, and so forth.

Network device 1000 includes a central processing unit (CPU) 1004, interfaces 1002, and a bus 1010 (e.g., a PCI bus). When acting under the control of appropriate software or firmware, the CPU 1004 is responsible for executing packet management, error detection, and/or routing functions. The CPU 1004 preferably accomplishes all these functions under the control of software including an operating system and any appropriate applications software. CPU 1004 can include one or more processors 1008, such as a processor from the INTEL X86 family of microprocessors. In some cases, processor 1008 can be specially designed hardware for controlling the operations of network device 1000. In some cases, a memory 1006 (e.g., non-volatile RAM, ROM, etc.) also forms part of CPU 1004. However, there are many different ways in which memory could be coupled to the system.

The interfaces 1002 are typically provided as modular interface cards (sometimes referred to as "line cards"). Generally, they control the sending and receiving of data packets over the network and sometimes support other peripherals used with the network device 1000. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces can include ports appropriate for communication with the appropriate media. In some cases, they can also include an independent processor and, in some instances, volatile RAM. The independent processors can control such communications intensive tasks as packet switching, media control, signal processing, crypto processing, and management. By providing separate processors for the communication intensive tasks, these interfaces allow the master CPU (e.g., 1004) to efficiently perform routing computations, network diagnostics, security functions, etc.

Although the system shown in FIG. 10 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 1000.

Regardless of the network device's configuration, it can employ one or more memories or memory modules (including memory 1006) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc. Memory 1006 could also hold various software containers and virtualized execution environments and data.

The network device 1000 can also include an application-specific integrated circuit (ASIC) 1012, which can be configured to perform routing and/or switching operations. The ASIC 1012 can communicate with other components in the network device 1000 via the bus 1010, to exchange data and signals and coordinate various types of operations by the network device 1000, such as routing, switching, and/or data storage operations, for example.

Aspect 1. A method comprising: receiving a session request at a control plane gateway in association with a dual connectivity attachment request by a user equipment to connect to a network; sending a request for tunnel binding IDs to a Policy and Charging Rules Function (PCRF), wherein each of the tunnel binding IDs is associated with one of different types of network access for the user equipment; receiving the tunnel binding IDs from the PCRF; and programming a user plane with the tunnel binding IDs and corresponding charging rules for the different types of network access, the user equipment being charged for data usage using the charging rules and depending on which of the different types of network access is used by the user equipment to connect to the network.

Aspect 2. The method of Aspect 1, further comprising: receiving, at a P-Gateway (PGW) of the user plane, a tunnel switch marker indicating that the user equipment has switched from a first type of network access to a second type of network access; and determining the corresponding charging rules to apply to data usage by the user equipment based on the tunnel switch marker and the charging rules.

Aspect 3. The method of any of Aspects 1 to 2, wherein the tunnel switch marker is received using a general packet radio service (GPRS) tunnelling protocol user plane (GTPU) message from a Serving-GW (SGW) of the user plane.

Aspect 4. The method of any of Aspects 1 to 3, wherein the tunnel switch marker is received in response to a Presence Reporting Area (PRA) indication received from a mobility management entity (MME).

Aspect 5. The method of any of Aspects 1 to 4, wherein the PRA indication is received in a modify bearer request from the MME triggered when the MME receives a E-UTRAN Radio Access Bearer (E-RAB) modification from a master e-NodeB.

Aspect 6. The method of any of Aspects 1 to 5, wherein the different types of network access include a 4 G access type and a 5 G access type.

Aspect 7. The method of any of Aspects 1 to 6, wherein the session request includes a credit control request (CCR) with a Dual Connectivity New Radio (DCNR) bit set therein.

Aspect 8. A device comprising: one or more memories having computer-readable instructions stored therein; and one or more processors configured to execute the computer-readable instructions to: receive a session request at a control plane gateway in association with a dual connectivity attachment request by a user equipment to connect to a network; send a request for tunnel binding IDs to a Policy and Charging Rules Function (PCRF), wherein each of the tunnel binding IDs is associated with one of different types of network access for the user equipment; receive the tunnel binding IDs from the PCRF; and program a user plane with the tunnel binding IDs and corresponding charging rules for the different types of network access, the user equipment being charged for data usage using the charging rules and depending on which of the different types of network access is used by the user equipment to connect to the network.

Aspect 9. The device of Aspect 8, wherein a P-Gateway (PGW) of the user plane is configured to: receive a tunnel switch marker indicating that the user equipment has switched from a first type of network access to a second type of network access; and determine the corresponding charging rules to apply to data usage by the user equipment based on the tunnel switch marker and the charging rules.

Aspect 10. The device of any of Aspects 8 to 9, wherein the tunnel switch marker is received using a general packet radio service (GPRS) tunnelling protocol user plane (GTPU) message from a Serving-GW (SGW) of the user plane.

Aspect 11. The device of any of Aspects 8 to 10, wherein the tunnel switch marker is received in response to a Presence Reporting Area (PRA) indication received from a mobility management entity (MME).

Aspect 12. The device of any of Aspects 8 to 11, wherein the PRA indication is received in a modify bearer request from the MME triggered when the MME receives a E-UTRAN Radio Access Bearer (E-RAB) modification from a master e-NodeB.

Aspect 13. The device of any of Aspects 8 to 12, wherein the session request includes a credit control request (CCR) with a Dual Connectivity New Radio (DCNR) bit set therein.

Aspect 14. The device of any of Aspects 8 to 13, wherein the different types of network access include a 4 G access type and a 5 G access type.

Aspect 15. One or more non-transitory computer-readable media comprising computer-readable instructions, which when executed by one or more processors, cause the one or more processors to: receive a session request at a control plane gateway in association with a dual connectivity attachment request by a user equipment to connect to a network; send a request for tunnel binding IDs to a Policy and Charging Rules Function (PCRF), wherein each of the tunnel binding IDs is associated with one of different types of network access for the user equipment; receive the tunnel binding IDs from the PCRF; and program a user plane with the tunnel binding IDs and corresponding charging rules for the different types of network access, the user equipment being charged for data usage using the charging rules and depending on which of the different types of network access is used by the user equipment to connect to the network.

Aspect 16. The one or more non-transitory computer-readable media of Aspect 15, wherein a P-Gateway (PGW) of the user plane is configured to: receive a tunnel switch marker indicating that the user equipment has switched from a first type of network access to a second type of network access; and determine the corresponding charging rules to apply to data usage by the user equipment based on the tunnel switch marker and the charging rules.

Aspect 17. The one or more non-transitory computer-readable media of any of Aspects 15 to 16, wherein the tunnel switch marker is received using a general packet radio service (GPRS) tunnelling protocol user plane (GTPU) message from a Serving-GW (SGW) of the user plane.

Aspect 18. The one or more non-transitory computer-readable media of any of Aspects 15 to 17, wherein the tunnel switch marker is received in response to a Presence Reporting Area (PRA) indication received from a mobility management entity (MME).

Aspect 19. The one or more non-transitory computer-readable media of any of Aspects 15 to 18, wherein the PRA indication is received in a modify bearer request from the MME triggered when the MME receives a E-UTRAN Radio Access Bearer (E-RAB) modification from a master e-NodeB.

Aspect 20. The one or more non-transitory computer-readable media of any of Aspects 15 to 19, wherein the different types of network access include a 4G access type and a 5G access type.

For clarity of explanation, in some instances the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving a session request at a control plane gateway in association with a dual connectivity attachment request by a user equipment to connect to a network;
sending a request for tunnel binding IDs to a Policy and Charging Rules Function (PCRF), wherein each of the tunnel binding IDs is associated with one of different types of network access for the user equipment;
receiving, from the PCRF, the tunnel binding IDs and corresponding charging rules for a first type of network access and a second type of network access; and
pre-installing, on a user plane gateway, the tunnel binding IDs and the corresponding charging rules for the first type of network access and the second type of network access, wherein the pre-installation occurs during an initial attachment of the user equipment.

2. The method of claim 1, further comprising:
receiving, at a P-Gateway (PGW) of the user plane, a tunnel switch marker indicating that the user equipment has switched from a first type of network access to a second type of network access; and
determining the corresponding charging rules to apply to data usage by the user equipment based on the tunnel switch marker and the charging rules.

3. The method of claim 2, wherein the tunnel switch marker is received using a general packet radio service (GPRS) tunnelling protocol user plane (GTPU) message from a Serving-GW (SGW) of the user plane.

4. The method of claim 2, wherein the tunnel switch marker is received in response to a Presence Reporting Area (PRA) indication received from a mobility management entity (MME).

5. The method of claim 4, wherein the PRA indication is received in a modify bearer request from the MME triggered when the MME receives a E-UTRAN Radio Access Bearer (E-RAB) modification from a master e-NodeB.

6. The method of claim 1, wherein the different types of network access include a 4G access type and a 5G access type.

7. The method of claim 1, wherein the session request includes a credit control request (CCR) with a Dual Connectivity New Radio (DCNR) bit set therein.

8. A device comprising:
one or more memories having computer-readable instructions stored therein; and
one or more processors configured to execute the computer-readable instructions to:
receive a session request at a control plane gateway in association with a dual connectivity attachment request by a user equipment to connect to a network;
send a request for tunnel binding IDs to a Policy and Charging Rules Function (PCRF), wherein each of the tunnel binding IDs is associated with one of different types of network access for the user equipment;
receive, from the PCRF, the tunnel binding IDs and corresponding charging rules for a first type of network access and a second type of network access; and
pre-install, on a user plane gateway, the tunnel binding IDs and corresponding charging rules for the first type of network access and the second type of network access, wherein the pre-installation occurs during an initial attachment of the user equipment.

9. The device of claim 8, wherein a P-Gateway (PGW) of the user plane is configured to:
receive a tunnel switch marker indicating that the user equipment has switched from a first type of network access to a second type of network access; and
determine the corresponding charging rules to apply to data usage by the user equipment based on the tunnel switch marker and the charging rules.

10. The device of claim 9, wherein the tunnel switch marker is received using a general packet radio service (GPRS) tunnelling protocol user plane (GTPU) message from a Serving-GW (SGW) of the user plane.

11. The device of claim 9, wherein the tunnel switch marker is received in response to a Presence Reporting Area (PRA) indication received from a mobility management entity (MME).

12. The device of claim 11, wherein the PRA indication is received in a modify bearer request from the MME triggered when the MME receives a E-UTRAN Radio Access Bearer (E-RAB) modification from a master e-NodeB.

13. The device of claim 8, wherein the different types of network access include a 4G access type and a 5G access type.

14. The device of claim 9, wherein the session request includes a credit control request (CCR) with a Dual Connectivity New Radio (DCNR) bit set therein.

15. One or more non-transitory computer-readable media comprising computer-readable instructions, which when executed by one or more processors, cause the one or more processors to:
receive a session request at a control plane gateway in association with a dual connectivity attachment request by a user equipment to connect to a network; send a request for tunnel binding IDs to a Policy and Charging Rules Function (PCRF), wherein each of the tunnel binding IDs is associated with one of different types of network access for the user equipment;

receive the tunnel binding IDs from the PCRF, the tunnel binding IDs and corresponding charging rules for a first type of network access and a second type of network access; and pre-install, on a user plane gateway, the tunnel binding IDs and corresponding charging rules for the first type of network access and the second type of network access, wherein the pre-installation occurs during an initial attachment of the user equipment.

16. The one or more non-transitory computer-readable media of claim 15, wherein a P-Gateway (PGW) of the user plane is configured to:

receive a tunnel switch marker indicating that the user equipment has switched from a first type of network access to a second type of network access; and determine the corresponding charging rules to apply to data usage by the user equipment based on the tunnel switch marker and the charging rules.

17. The one or more non-transitory computer-readable media of claim 16, wherein the tunnel switch marker is received using a general packet radio service (GPRS) tunnelling protocol user plane (GTPU) message from a Serving-GW (SGW) of the user plane.

18. The one or more non-transitory computer-readable media of claim 16, wherein the tunnel switch marker is received in response to a Presence Reporting Area (PRA) indication received from a mobility management entity (MME).

19. The one or more non-transitory computer-readable media of claim 18, wherein the PRA indication is received in a modify bearer request from the MME triggered when the MME receives a E-UTRAN Radio Access Bearer (E-RAB) modification from a master e-NodeB.

20. The one or more non-transitory computer-readable media of claim 15, wherein the different types of network access include a 4G access type and a 5G access type.

\* \* \* \* \*